(12) United States Patent
Evans

(10) Patent No.: US 6,226,631 B1
(45) Date of Patent: *May 1, 2001

(54) APPARATUS AND METHODOLOGY FOR SUBMITTING SEARCH QUERIES

(75) Inventor: David A. Evans, Pittsburgh, PA (US)

(73) Assignee: Claritech Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/390,247

(22) Filed: Sep. 3, 1999

Related U.S. Application Data

(62) Division of application No. 08/900,638, filed on Jul. 25, 1997.

(51) Int. Cl.[7] .................................................. G06F 17/30
(52) U.S. Cl. ........................ 707/3; 707/530; 382/173
(58) Field of Search .................................. 707/3–5, 104, 707/530–531; 382/306, 173

(56) References Cited

U.S. PATENT DOCUMENTS

| | | | |
|---|---|---|---|
| 4,674,065 | 6/1987 | Lange et al. | 382/311 |
| 4,773,039 | 9/1988 | Zamora | 707/540 |
| 4,864,502 | 9/1989 | Kucera et al. | 704/8 |
| 5,206,949 | 4/1993 | Cochran et al. | 707/4 |
| 5,359,673 | 10/1994 | De La Beaujardiere | 382/229 |
| 5,440,481 | 8/1995 | Kostoff et al. | 707/5 |
| 5,541,836 | 7/1996 | Church et al. | 704/7 |
| 5,970,483 | * 10/1999 | Evans | 707/3 |

* cited by examiner

Primary Examiner—Hosain T. Alam
Assistant Examiner—Jean Bolte Fleurantin
(74) Attorney, Agent, or Firm—Jones, Day, Reavis & Pogne; Blaney Harper

(57) ABSTRACT

An document image that is the source of Optical Character Recognition (OCR) output is displayed so that a user can select a region of the displayed document image. When the region is selected, text of the OCR output corresponding to the selected region is submitted as an input to a search engine.

6 Claims, 5 Drawing Sheets

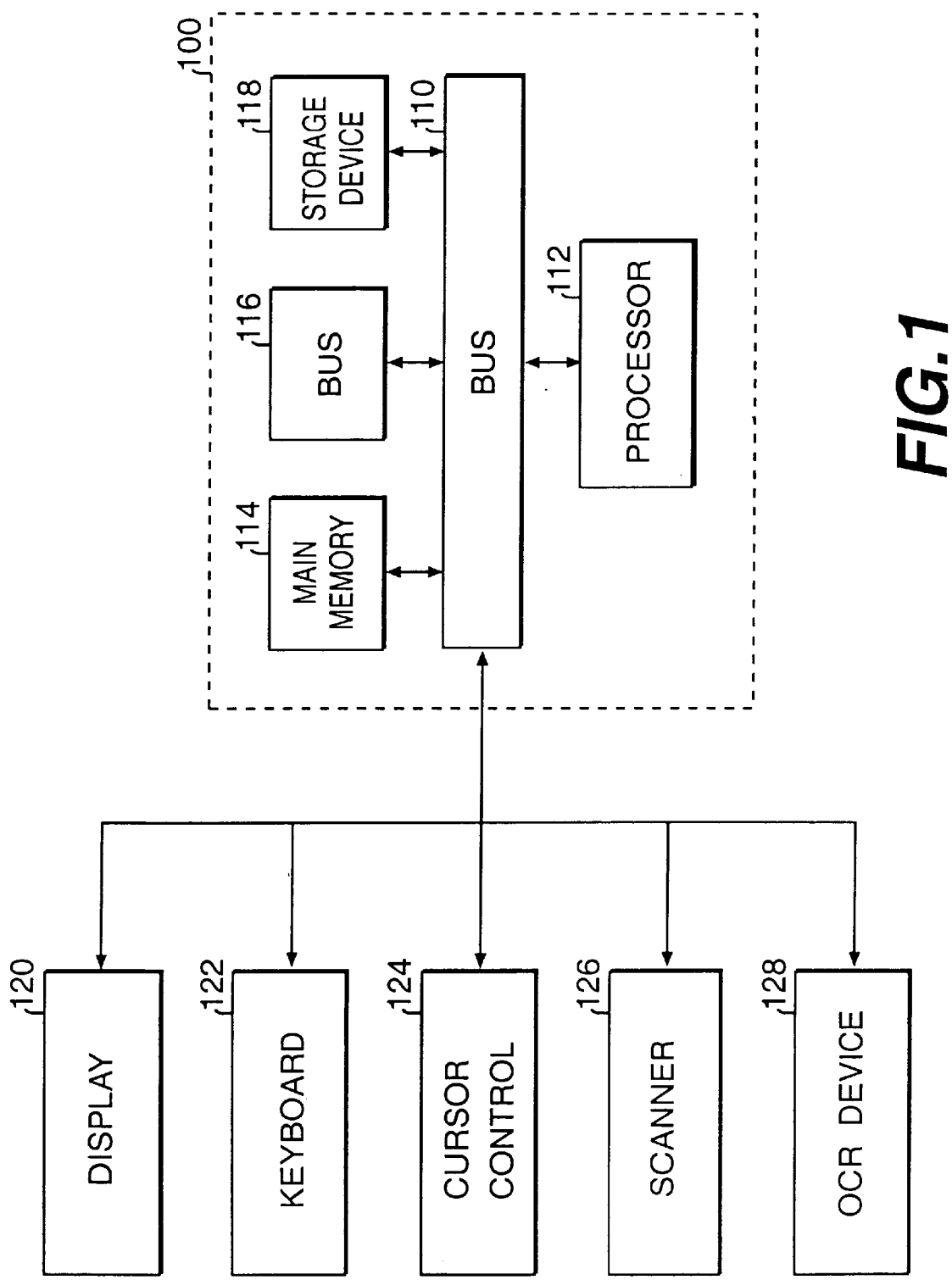

FIG.3(a)

IMAGE DISPLAY ⌐300

WE THE PEOPLE OF THE UNITED STATES, IN ORDER TO↑FORM A MORE PERFECT UNION, ESTABLISH JUSTICE, ENSURE DOMESTIC TRANQUILITY, PROVIDE FOR THE COMMON DEFENCE, PROMOTE THE GENERAL WELFARE, AND SECURE THE BLESSINGS OF LIBERTY TO OURSELVES AND OUR POSTERITY, DO ORDAIN AND ESTABLISH THIS CONSTITUTION FOR THE UNITED STATES OF AMERICA

FIG.3(b)

IMAGE DISPLAY ⌐310

WE THE PEOPLE OF THE UNITED STATES, IN ORDER TO FORM A MORE PERFECT UNION, ESTABLISH JUSTICE, ENSURE DOMESTIC TRANQUILITY, PROVIDE FOR THE COMMON DEFENCE,↑PROMOTE THE GENERAL WELFARE, AND SECURE THE BLESSINGS OF LIBERTY TO OURSELVES AND OUR POSTERITY, DO ORDAIN AND ESTABLISH THIS CONSTITUTION FOR THE UNITED STATES OF AMERICA

APPARATUS AND METHODOLOGY FOR SUBMITTING SEARCH QUERIES

This application is a divisional of patent application Ser. No. 08/900,638 filed Jul. 25, 1997, now allowed.

TECHNICAL FIELD

The present invention relates to computer systems and, more particularly, to a user interface for a search engine.

BACKGROUND ART

The volume of documents in computer databases is rapidly expanding. In spite of this expansion, paper documents are still in wide use. As a result, it is generally useful to be able to convert the paper documents into a form that a computer may use to store or otherwise process the documents. A typical technique for this conversion process is to create a "document image," which is typically a bitmap representation of the paper document. This bitmap representation is in digital form. In particular, a bitmap representation is a matrix of digital values wherein each value represents black-and-white, grey scale, or color pixels arranged to form an image of the document. A computer converts the digital values into pixels that are displayed for a user on a display unit, such as a computer monitor. The combined effect of the pixels is to create a document image which is read by the user from the computer monitor.

Although a document image is an appropriate form for representing most, if not all, of the information on a paper document, e.g., words and pictures, this form is not generally appropriate for a computer to perform textual operations. An example of a textual operation is searching for documents that match certain terms or keywords of a query input by a user. A representation for a document which is more conducive for computer-implemented textual operations is a text code. In a text code, each letter of the document is encoded as an entity in a standard encoding format, e.g. ASCII. Since each letter is separately encoded, a search engine, for example, can efficiently examine the textual content of a document and determine whether the document matches a query.

The problem with a text code is that it does not represent non-alphabetic and non-numeric images, such as pictures, in the document. Generally, when a document is converted into a form for use with a computer, it is desirable that both text operations and image display can be performed on the document. Accordingly, some computer systems maintain both a document image and document text for each document stored in the system. The document text is used for textual operations, such as searching a database of document texts for search terms, but the corresponding document image of a matching document is displayed to the user, so that graphical information contained in the matching document is presented to the user as well as the textual information.

A disadvantage of conventional computer systems is apparent when a user wishes to submit a query for a search, using terms or keywords found in the matched document. In these computer systems, the user has to type in the terms or display the document text for selecting the new search terms, at a considerable cost in time and effort. More importantly, these systems do not lend themselves to automated search systems having queries generated from the text of the matched document.

DISCLOSURE OF THE INVENTION

There exists a need for an input method that facilitates input to a search engine from retrieved document images.

This and other needs are met by the present invention, in which characters in a document image from an original paper document are recognized, e.g. through OCR, to produce a document text. Regions in the document image that correspond to words in the document text are determined. The document image is displayed, so that a user can select a portion of the document image. Text from the document text, e.g. a word or phrase, that corresponds to the portion of the document image is determined and submitted as input for a search engine.

In one embodiment, the portion of the document image is selected according to a first and a second co-ordinate within the document image. First and second offsets within the document text are determined from the first and second co-ordinates respectively.

By allowing the user to select text from a displayed the document image and automatically retrieving corresponding text in the document time, the user saves the time involved in keying in the search term by hand or by manually going to the document text.

Additional objects, advantages, and novel features of the present invention will be set forth in part in the detailed description which follows, and in part will be come apparent upon examination or may be learned by practice of the invention. The objects and advantages of the invention may be realized and obtained by means of the instrumentalities and combinations particularly pointed out in the appended claims.

BRIEF DESCRIPTION OF DRAWINGS

The present invention is illustrated by way of example, and not by limitation, in the figures of the accompanying drawings, wherein elements having the same reference numeral designations represent like elements throughout and wherein:

FIG. 1 is a high-level block diagram of a computer system with which the present invention can be implemented.

FIG. 3(a) and FIG. 3(b) are an exemplary screen displays according to an embodiment of the present invention.

DETAILED DESCRIPTION OF THE INVENTION

Figure 2A:
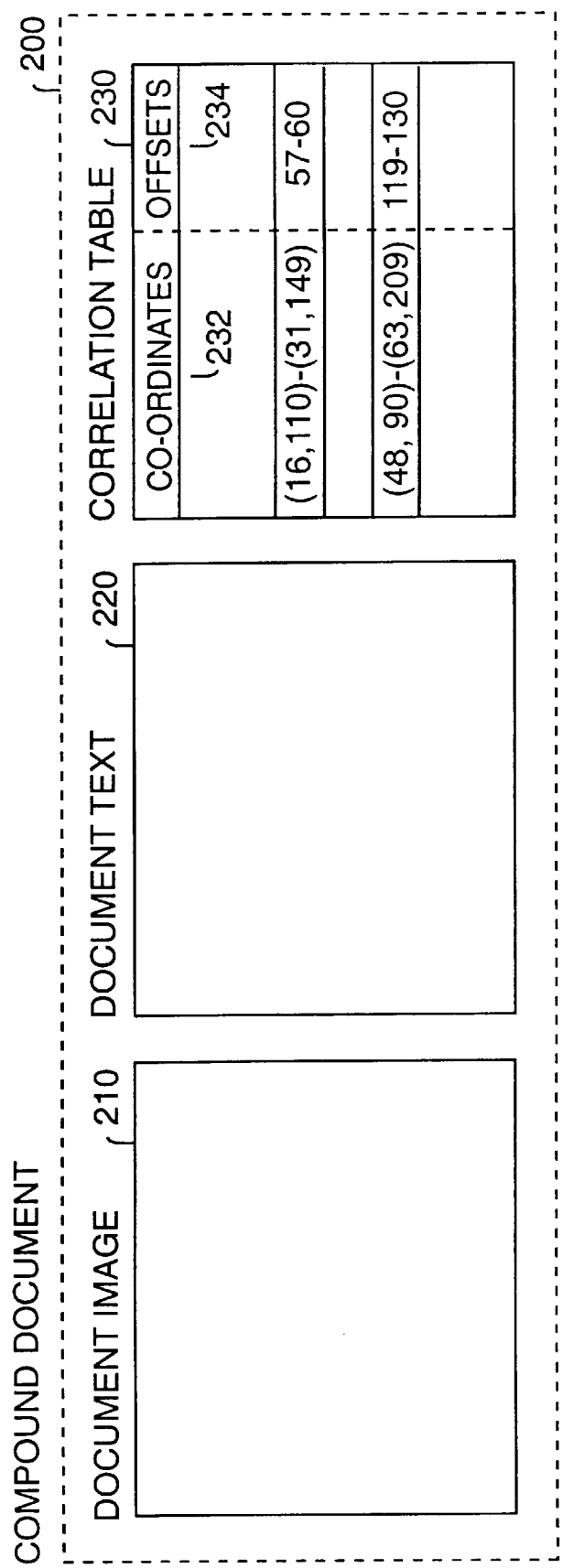
FIG. 2(a) is a block diagram of the architecture of a compoud document.

A method and apparatus for submitting search queries from a displayed document image are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Referring to FIG. 1, depicted is a block diagram of a computer system 100 upon which an embodiment of the present invention can be implemented. Computer system 100 includes a bus 110 or other communication mechanism for communicating information, and a processor 112 coupled with bus 110 for processing information. Computer system 100 further comprises a random access memory (RAM) or other storage device 114 (referred to as main memory), coupled to bus 110 for storing information and instructions to be executed by processor 112. Main memory 114 also may be used for storing temporary variables or other intermediate information during execution of instructions by processor 112. Computer system 100 also comprises a read only memory (ROM) and/or other storage device 116 coupled to bus 110 for storing static information and instructions for processor 112. A data storage device 118, such as a magnetic disk or optical disk and its corresponding disk drive, can be coupled to bus 110 for storing information and instructions.

Input and output devices can also be coupled to computer system 100 via bus 110. For example, computer system 100 uses a display unit 120, such as a cathode ray tube (CRT), for displaying information to a computer user. Computer system 100 further uses a keyboard 122 and a cursor control 124, such as a mouse. In addition, computer system 100 may employ a scanner 126 for converting paper documents into a computer readable format. Furthermore, computer system 100 can use an Optical Character Recognition (OCR) device 128 to recognize characters in a document image produced by scanner 126 or stored in main memory 114 or storage device 118. Alternatively, the functionality of OCR device 128 can be implemented in software, by executing instructions stored in main memory 114 with processor 112. As an option, scanner 126 and OCR device 128 can be combined into a single device configured to both scan a paper document and recognize characters thereon.

The present invention is related to the use of computer system 100 for submitting input to a search engine from a displayed document image. According to one embodiment, submitting input to a search engine from a displayed document image is performed by computer system 100 in response to processor 112 executing sequences of instructions contained in memory 114. Such instructions may be read into memory 114 from another computer-readable medium, such as data storage device 118. Execution of the sequences of instructions contained in memory 114 causes processor 112 to perform process steps that will be described hereafter. In alternative embodiments, hard-wired circuitry may be used in place of or in combination with software instructions to implement the present invention. Thus, the present invention is not limited to any specific combination of hardware circuitry and software.

The software aspects encompass computer readable media or carrier waves bearing sequences of computer executable instructions for performing the steps of the invention. A computer readable medium, as used herein, may be any medium that can bear instructions or code for performing a sequence of steps in a machine readable form, such as a floppy disk, flexible disk, hard disk, magnetic tape, any other magnetic medium, a CD-ROM, any other optical medium, paper tape, punch cards, any other physical medium with patterns of holes, a RAM, ROM, PROM, EPROM, FLASH-EPROM, and any other memory chip or cartridge. A carrier wave signal is any type of signal that may carry digital information representative of the instructions or code for performing a sequence of steps. Such a carrier wave may be received via a network, over a modem, or as a radio-frequency or infrared signal, or any other type of signal which a computer may receive and decode.

COMPOUND DOCUMENT ARCHITECTURE

A compound document contains multiple representations of a document and treats the multiple representations as a logical whole. A compound document 200, shown in FIG. 2(a), is stored in a memory, such as main memory 114 or storage device 118 of computer 100.

Compound document 200 comprises a document image 210, which is a bitmap representation of a document, e.g. a TIFF file produced from scanner 126. For example, a copy of the U.S. Constitution on paper may be scanned by scanner 126 to produce a document image of the Constitution in document image 210.

A bitmap representation is an array of pixels, which can be monochrome (e.g. black and white) or polychrome (e.g., red, blue, green, etc.). Thus, the location of a rectangular region in the document image 210 can be identified, for example, by the co-ordinates of the upper left corner and the lower right corner of the rectangle. In the example of scanning the U.S. Constitution, the first letter of the word "form" in the preamble, may be located in a rectangle with an upper left co-ordinate of (16, 110) and a lower right co-ordinate of (31, 119). Accordingly, the last of letter of the same word would be located with the co-ordinates (16, 140) and (31, 149).

Figure 2B:
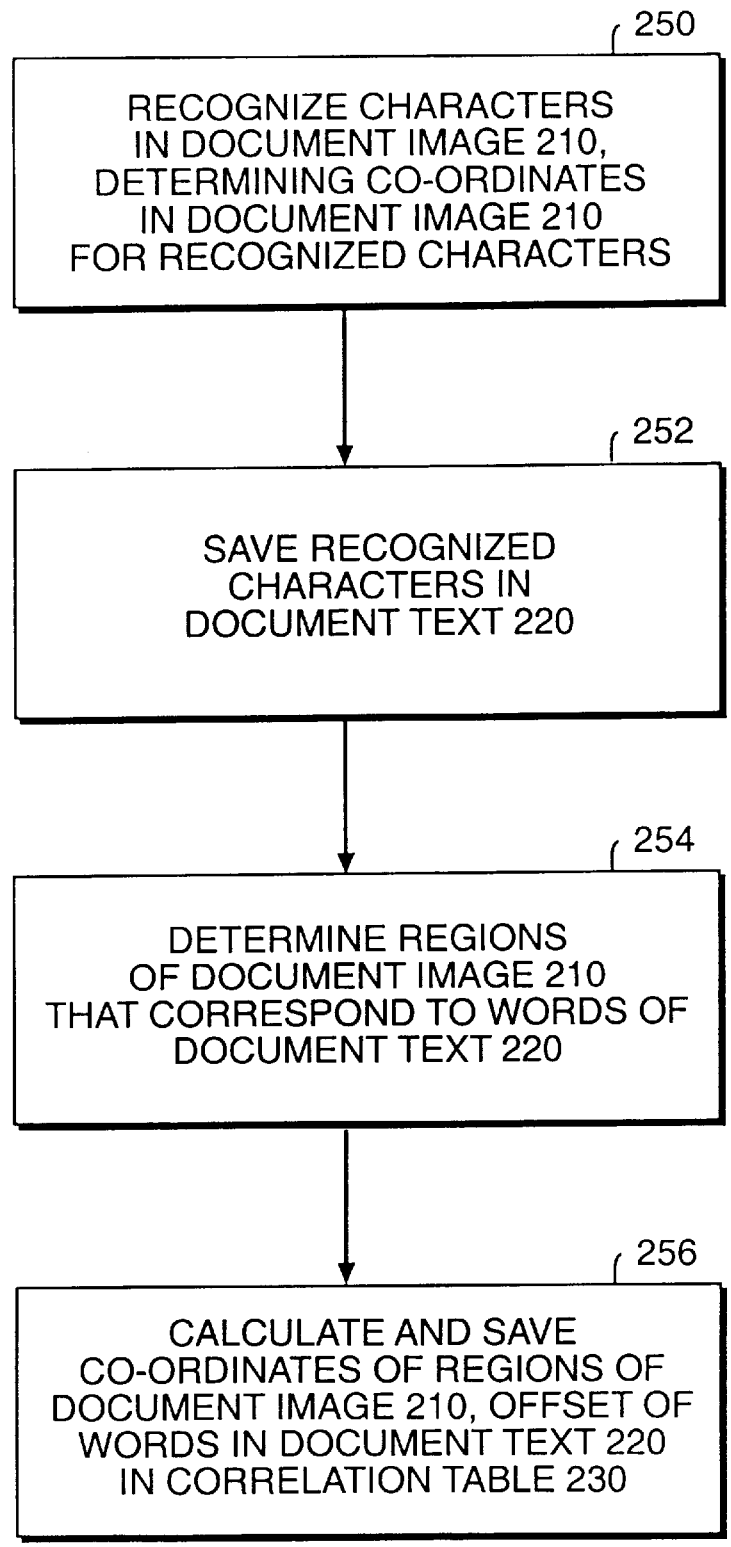
FIG. 2(b) is a flow chart illustrating the operation of creating a compound document.

Compound document 200 also comprises a document text 220 and a correlation table 230, which may be produced by the method illustrated in the flow chart of FIG. 2(b). A document text 220 is a sequence of 8-bit or 16-bit bytes that encode characters in an encoding such as ASCII, EBCDIC, or Unicode. Thus, characters in the document text 220 can be located by offsets into the document text 220. In the example, the first character of the word "form" in the preamble of the U.S. Constitution is at offset 57, and the last character of the word is at offset 60.

Referring to FIG. 2(b), characters in document image 210 are recognized in step 250, by OCR device 128 or an equivalent thereof, and saved in step 252 in document text 220. OCR device 128 is also configured to output in step 250 the co-ordinates in the document image of the characters that are recognized. Thus, recognized characters at a known offset in the document text 220 can be correlated with regions of the document image 210. In the example, the character at offset 57 is correlated with the region defined by the co-ordinates (16, 110) and (31, 119).

In step 254, words in the document text 220 are identified, for example, by taking the characters between spaces as words. In step 256, the regions in the document image 210 that correspond to the characters of the words are coalesced into one region corresponding to an entire word of the document text 220. In one embodiment, the region of document is defined as a rectangle with the most upper left co-ordinate and the most lower right co-ordinate of the co-ordinates of the regions corresponding to the individual characters. For example, the region corresponding to the word "form" in the preamble is defined by a rectangle with the co-ordinates (16, 110) and (31, 149). Alternatively, a list of the co-ordinates for all the underlying character may be saved, especially for documents with mixed size characters.

Information about each word of document text 220 is saved in step 254 in correlation table 230, so that regions of document image 210 can be correlated with words in document text 220. Specifically, correlation table 230 stores a pair of co-ordinates 232 defining the region in document image 210, and a pair of offsets 234 defining the location of the word in document text 220. In the example, the word "form" would have a pair of co-ordinates 232 of (16, 110) and (31, 149) and a pair of offsets 234 of 57 and 6.

With correlation table 230, offsets 234 in document text 220 correspond to regions of document image 210 identified by co-ordinates 232, and vice versa. For example, given a co-ordinate of (23, 127), the co-ordinate 232 file of the correlation table 230 can be scanned to determine that the given co-ordinate is found in a word at offsets 57–60. The word at that offset in document text 220 can be fetched from document text 220, in the example, the word "form." In the other direction, the correlation table 230 can be scanned for a given offset, e.g. 58, and the resulting rectangle with co-ordinates of (16, 110) and (31, 149) can be identified. Thus, the compound document architecture described herein provides a way of correlating the location of words in the document text 220 with corresponding regions of the document image 210.

SEARCH ENGINE USER INTERFACE

The scanned image of a document that matches a query, i.e. document image 210, is retrieved from a database and displayed to a user, so that non-textual information as well as textual information contained in the document may be output to the user. In the example of retrieving the U.S. Constitution, the scanned image of the preamble may displayed in image display 300 as shown in FIG. 3(a).

Figure 4:
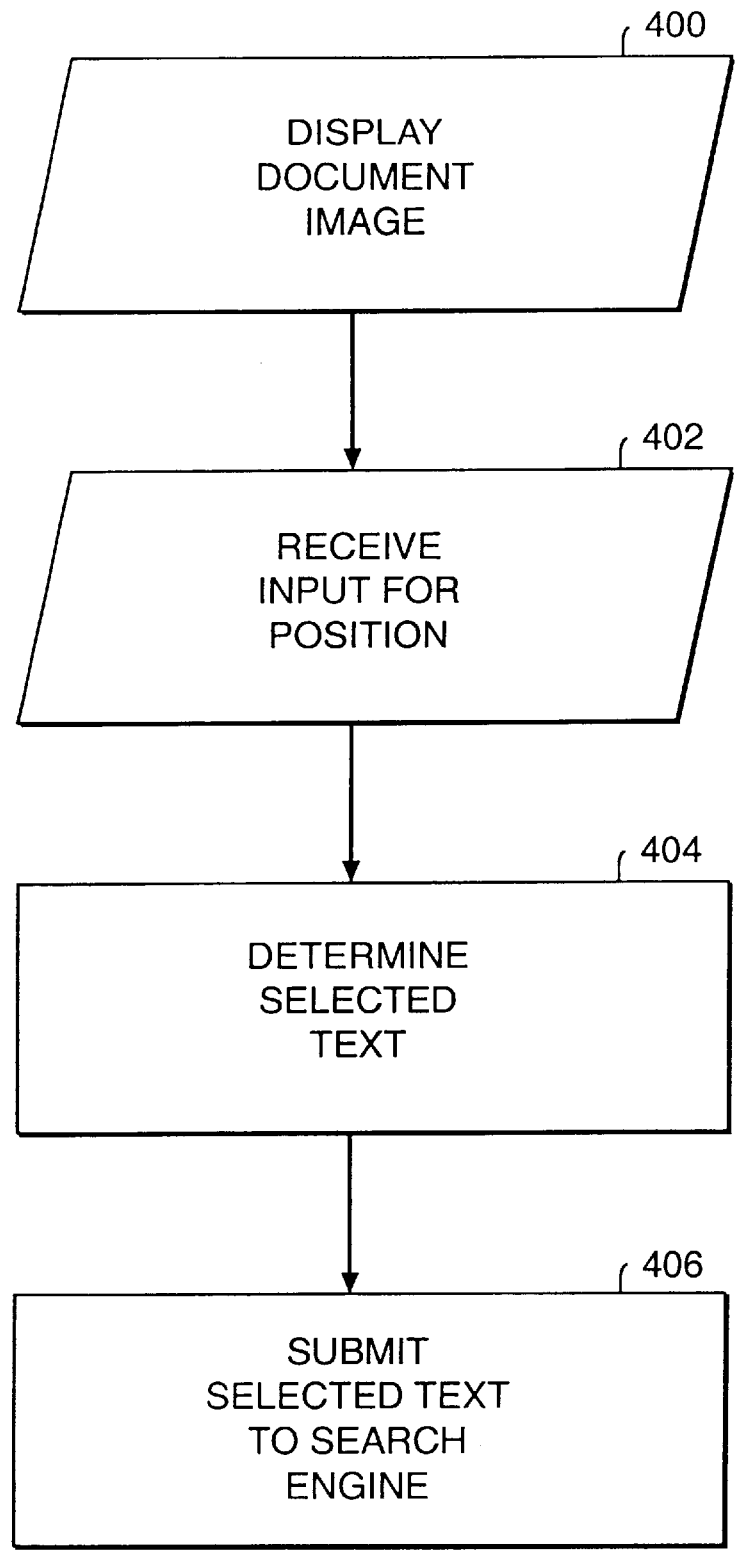
FIG. 4 is a flow chart illustrating the operation of submitting search queries from a displayed document image according to an embodiment.

The operation of inputting a new search query with terms from a displayed document image 210 according to an embodiment of the invention is illustrated in the flow chart of FIG. 4. In step 400, the document image 210 is displayed as image display 200 on a display unit 120, such as a high-resolution monitor. In order to display the initial document text, a search engine retrieves a document text 220 by matching a search term or combination thereof to regions of text contained in the documents of a database. This type of conventional search engine is well known in the art. The database of documents is produced from respective document images 210 by recognizing characters as explained hereinbefore.

Once a document text has been retrieved, a region in the document image that features a matching search term is identified. This region of the document image is displayed in a visually distinctive manner. One visually distinctive manner is highlighting the featured region, e.g. by changing the background color from white to yellow. Other visually distinctive manners include blinking or flashing the foreground color of featured region in the document image 210 or outlining the featured region in another color.

Once a region of the initially retrieved document has been displayed, a cursor 302 is displayed over the image display 200. The user then positions the cursor 302 with the cursor control 124, such as a mouse, track-ball, or joy-stick, over any part of the image display 300. In step 402 of FIG. 4, the computer receives input that selects a range of positions on the image display 300. This input may be generated when the user activates a button, in which case, the cursor control 124 sends the current position of the cursor 302 as input. In order to select a range of positions, at least two positions are input. For example, if the user is using a mouse as the cursor control 124, a click-and-drag operation sends two positions for selecting a block of text. In a click-and-drag operation, the first position is sent when the user clicks down on the mouse button, and the second position is sent when the user release the mouse button after moving the mouse. Operations analogous to a click-and-drag may be employed for other implementations of cursor control 124, as known in the art. FIG. 3(a) illustrates a cursor 302 at the beginning of an exemplary click-and-drag operation, and FIG. 3(b) illustrates the position of the cursor 302 at the end of the operation.

Positions identified with the input received in 312 are converted from the co-ordinate system of the image display 300 into the co-ordinate system of the document image 210, according to mapping techniques well-known in the art. Co-ordinate conversion is often necessary, because the document image 210 of a large document will not fit in a smaller image display 300.

In the example illustrated in FIG. 3(a), the position of cursor 302 in image display 300 at the beginning of a click-and-drag operation corresponds to co-ordinate (16, 110) of document image 210. In FIG. 3(b), the position of cursor 302 in image display 310 at the end of a click-and-drag operation corresponds to co-ordinate (63, 209) of document image 210.

In step 404, the correlation table 230 is scanned for entries specifying regions 232 that encompass the range of co-ordinates derived from input received in step 312. In the example, the beginning of the range at co-ordinate (16, 110) is encompassed by a region defined by the co-ordinates (16, 110) to (31, 149) and has corresponding offsets 57–60. Thus, the beginning of the range in terms of offsets of document text 220 is at offset 57. Likewise, the end of the range at co-ordinate (63, 209) is encompassed by a region defined by the co-ordinates (48, 90) to (63, 209) with corresponding offsets 119–130. Thus, the end of the offset range is at offset 130 of document text 220. The selected text, therefore, is the text of document text 220 within the offset range. In the example, the selected text is within the offset range 57–130.

In step 406, the selected text within the offset range is extracted from document text 220 and submitted to the search engine as input for another search. By enabling the user to select a portion of the document image 210 and automatically extracting the correlated text from document text 220 for submission to a search engine, the search engine input processing apparatus and method according to one embodiment allows the user to submit additional queries to the search engine based on search results more easily.

While the invention has been particularly described and illustrated with reference to a preferred embodiment, it will be understood by one of skill in the art that changes in the above description or illustrations may be made with respect to formal detail without departing from the spirit and scope of the invention.

I claim:

1. A computer readable media bearing sequences of computer executable instructions for retrieving documents from a database, comprising the computer-implemented steps of:

creating a plurality of document images from a plurality of documents;

recognizing characters in said document images to produce a document text;

determining regions of the document images that correspond to words of the document text;

correlating said regions with said text;

searching said text in response to a query;

retrieving document text in response to said search;

displaying the corresponding document image;

receiving an input that selects a portion of the document image;

determining a selected text from the document text that corresponds to the portion of the document image;

generating an updated query from said selected text; and searching said text in response to said updated query.

2. The computer readable media of claim 1, wherein:

the step of receiving an input that selects a portion of the document image includes the step of receiving a first co-ordinate and a second co-ordinate in the document image; and the step of determining a selected text from the document text that corresponds to the portion of the document image includes the step of determining a first offset into the document text and a second offset into the document text based on the first co-ordinate and the second co-ordinate, respectively.

3. An input processing apparatus for a search engine, comprising:

an OCR device for recognizing characters in a document image to produce a document text;

a computer for reading said document text;

computer readable media bearing sequences of computer executable instructions for determining regions of the document image that correspond to words of the document text;

a display unit for displaying the document image;

a cursor control mechanism for receiving an input that selects a portion of the document image;

computer readable media bearing sequences of computer executable instructions for determining a selected text from the document text that corresponds to the portion of the document image; and computer readable media bearing sequences of computer executable instructions for updating a query based on said selected text.

4. The apparatus of claim 3, wherein:

the cursor control mechanism is configured to receive a first co-ordinate and a second co-ordinate in the document image; and said means for determining the selected text includes means for determining a first offset into the document text and a second offset into the document text based on the first co-ordinate and the second co-ordinate, respectively.

5. A method of retrieving documents from a database, comprising:

generating a carrier wave containing sequences of computer executable instructions for performing the steps of:

recognizing characters in document images to produce a document text;

determining regions of said document images that correspond to words of the document text;

correlating said regions with said text;

searching said text in response to a query;

retrieving document text in response to said search;

displaying the corresponding document image;

receiving an input that selects a portion of the document image;

determining a selected text from the document text that corresponds to the portion of the document image;

generating an updated query from said selected text; and searching said text in response to said updated query; and transmitting said carrier wave to a computer which executes said instructions contained in said carrier wave.

6. The method of claim 5, wherein:

the step of receiving an input that selects a portion of the document image includes the step of receiving a first co-ordinate and a second co-ordinate in the document image; and the step of determining a selected text from the document text that corresponds to the portion of the document image includes the step of determining a first offset into the document text and a second offset into the document text based on the first co-ordinate and the second co-ordinate, respectively.

* * * * *